United States Patent [19]

Entschladen et al.

[11] Patent Number: 4,918,749

[45] Date of Patent: Apr. 17, 1990

[54] RECEIVING CONFIGURATION FOR MICROWAVE SIGNALS

[75] Inventors: Helmut Entschladen, Bochum; Rainer Strietzel, Heidelberg; Bernd Siedelhofer, Schriesheim, all of Fed. Rep. of Germany

[73] Assignee: Licentia Patent-Verwaltungs-GmbH, Frankfurt, Fed. Rep. of Germany

[21] Appl. No.: 88,062

[22] Filed: Aug. 21, 1987

[30] Foreign Application Priority Data

Aug. 22, 1986 [DE] Fed. Rep. of Germany ....... 3628583

[51] Int. Cl.[4] ............ H04B 1/26

[52] U.S. Cl. ............ 455/327; 455/330

[58] Field of Search ............ 455/269, 280, 327, 330, 455/336, 337, 140; 333/204, 205, 208

[56] References Cited

U.S. PATENT DOCUMENTS

| | | | |
|---|---|---|---|
| 4,215,372 | 7/1980 | Suzuki | 455/280 |
| 4,355,420 | 10/1982 | Ishihara | 455/326 |
| 4,566,132 | 1/1986 | Meyer et al. | 455/327 |
| 4,667,693 | 6/1987 | Takayama | 455/327 |
| 4,679,249 | 7/1987 | Tanaka et al. | 455/327 |
| 4,691,379 | 9/1987 | Shizume | 455/327 |
| 4,710,974 | 12/1987 | Kupfer | 455/330 |

FOREIGN PATENT DOCUMENTS 2508201 2/1983 Fed. Rep. of Germany .

*Primary Examiner*—Benedict V. Safourek

*Assistant Examiner*—Curtis Kuntz

*Attorney, Agent, or Firm*—Spencer & Frank

[57] ABSTRACT

Receiver configuration for microwave signals with a receiver antenna, a rectifier circuit and a detector circuit, wherein only one single antenna is provided to receive a vertically polarized energy signal and a horizontally polarized data signal. It has separate detector circuits available for the energy signal and the data signal. The detector circuit for the energy signal consists of a voltage doubling circuit to generate an operating voltage and the detector circuit for the data signal consists of a diode with a shunt resistor to generate a modulated DC voltage.

10 Claims, 1 Drawing Sheet

RECEIVING CONFIGURATION FOR MICROWAVE SIGNALS

BACKGROUND OF THE INVENTION AND PRIOR ART

The invention refers to a receiver configuration for microwave signals, including a receiving antenna, a rectifier circuit and a detector circuit.

The transmission of information in the microwave range (above 1 GHz) is made possible by a new technology which has rapidly been expanded over the past years. An introduction into integrated microwave technology is provided by the Journal "Elektronik-Anzeiger", Vol. 1977, Nos. 4, 5, 6, 8 and 9 and from the Journal "Solid State Circuits", IEEE, SC-5 (1970), December, p. 292–303.

Usually microwave signals are transmitted in a wireless fashion using special antennas and are evaluated, demodulated, mixed, amplified etc., by electronic receivers. In this context, the receiving or transmitting antennas are constructed as horn antennas, dish antennas or in planar microstrip technology. Over the past years, microstrip technology has increasingly gained a hold since miniaturized microwave solid state elements can be implemented.

This type of a strip line is formed of a conducting base plane, a dielectrical carrier material (substrate plates) above the base or ground plane and a metallized printed conductor on top of the carrier material. Characteristic impedances from 20Ω to 150Ω known from high-frequency technology can also be implemented on a ceramic substrate by choosing proper dimensions of the strip lines. The higher losses of microstrip lines as compared to coaxial or hollow waveguides, which for the most part are due to ohmic losses, to a small extent are due to dielectric losses and for non-shielded circuits are due to radiation losses, are mostly compensated for by the reduced line length. The behavior of open circuit strip lines in radiating electromagnetic waves can be utilized for the production of planar antennas. Microstrip line resonators with a line length of $\lambda/2$ are most frequently used.

In order to transmit various microwave signals of different frequencies, polarization and modulation, several separate receiving antennas must be provided. This is required particularly if, for example, a strong, unmodulated HF signal and a weak information signal are to be transmitted. In addition, there are difficulties in the compulsory rectifier/detector demodulation circuit. Due to the intense range of modulation of the receiver diode due to the strong, unmodulated HF signal, the sensitivity of the input circuit for a weak, modulated signal is reduced, so that an increase in the level would be required for the modulated signal.

Beginning with German Patent DE-PS 25 08 201 in which a receiving facility in an integrated construction is supplied with energy through planar antennas in strip line technology by strong microwave radiation, it is accordingly an object of the invention to provide a receiving configuration for microwave signals, which overcomes the hereinafore-mentioned disadvantages of the heretofore-known devices of this general type and to provide a receiver configuration with only one antenna which receives and processes two signals that are very close in frequency with strongly differing amplitudes and varying polarizations.

SUMMARY OF THE INVENTION

With the foregoing and other objects in view there is provided, in accordance with the invention, a receiver configuration for microwave signals, comprising one single antenna for receiving a vertically polarized energy signal and a horizontally polarized data signal, and separate detector circuits connected to the antenna for the energy signal and the data signal, the detector circuit for the energy signal being formed of a rectifying and voltage doubling circuit generating an operating voltage, and the detector circuit for the data signal being formed of a diode with a shunt resistor for rectifying the data signal and generating a modulated DC voltage.

The use of only one antenna for the signals which differ in frequency, amplitude and polarization, provides a simple, space-saving and reasonable construction of the receiving configuration according to the invention. As a result, the entire setup can be integrated in an even simpler manner, so that all system functions can be housed in a module having one substrate plate. The division of the transmission into horizontal and vertical linearly polarized waves and the separate decoupling of the two signals that are received (energy signal and data signals), result in a doubling of the receiver channels. In spite of the great differences in output, with the energy signal being one hundred times greater than the data signal at the output, and the closeness of the frequencies of the transmitted signals, there is a good decoupling and thus a high quality of reception. Additional advantages will become clear from the following description.

Other features which are considered as characteristic for the invention are set forth in the appended claims.

Although the invention is illustrated and described herein as embodied in a receiving configuration for microwave signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawings.

DESCRIPTION OF THE PREFERRED EMBODIMENTS

Figure 1:
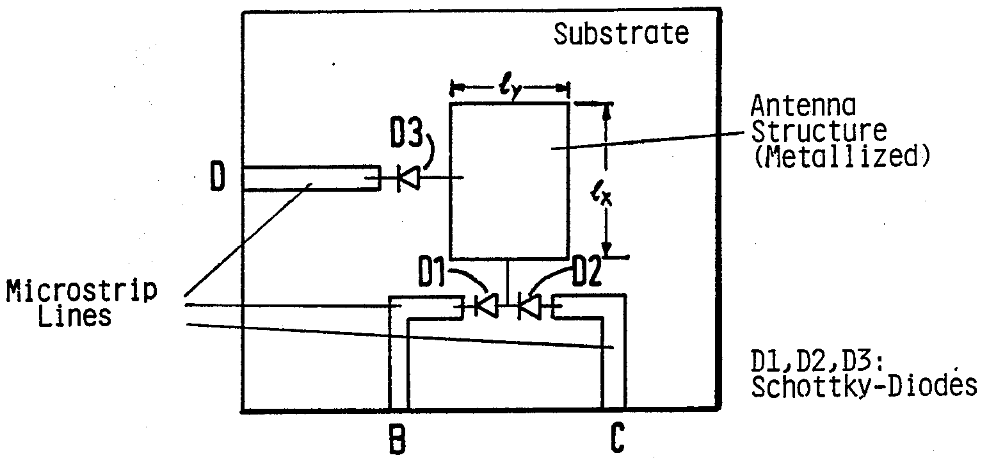
FIG. 1 is a diagrammatic and schematic top-plan view of a single substrate plate of a module on which all system functions are housed.

Referring now to the figures of the drawings in detail and first, particularly, to FIG. 1 thereof, there is seen a substrate 2 on which a metallized antenna structure 1 is disposed. Schottky diodes D1 and D2 are connected together and to the antenna structure at a central connection A and each lead to a respective terminal B,C through a respective strip line. A Schottky diode D3 is also connected to the antenna structure and leads to a terminal D through another strip line.

Figure 2:
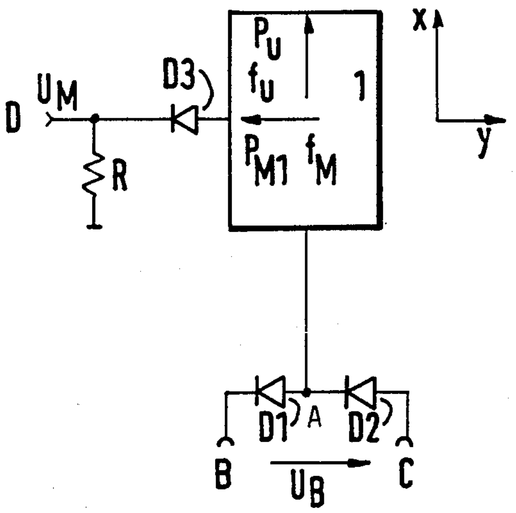
FIG. 2 is a schematic circuit diagram of an embodiment of the receiver configuration of the invention in which the substrate has been omitted.

Referring to FIG. 2 in which the substrate has been omitted and which shows greater detail, there is seen a receiver configuration according to the invention, at which two signals of almost identical frequency that are spaced apart by a few MHz, are beamed.

However, the amplitudes of the two signals differ greatly, by approximately 20 dB. The polarization planes of the two L- signals are mutually offset by 90°.

A non-modulated, strong HF carrier energy signal $P_U$ with a large amplitude is beamed with a vertical (or horizontal) linear polarization, while an amplitude-modulated data or information signal $P_M$ of reduced amplitude is beamed with a horizontal (or vertical) linear polarization. The working range of the transmitted signals is approximately 6 GHz.

The receiver configuration is formed of the antenna 1 constructed in microstrip technology which receives the vertical (horizontal) linearly polarized energy signals $P_U$ as well as the horizontal (vertical) linearly polarized data signal $P_M$. In this context, the dimensions of the antenna structure have been selected in such a way that the length in the x direction corresponds to half of the wavelength of the signal $$P_U\left(1_x = \frac{\lambda u}{2} = \frac{c}{2f_u}\right)$$

while the length in the y direction (1y) is exactly $$\frac{\lambda M}{2} = \frac{c}{2f_M},$$

where c is the effective propagation velocity in the substrate material.

The substrate on which the microstrip line antenna provided for the energy signal $P_U$ and the data signal $P_M$ is applied, is a dielectric substrate (aluminum oxide ceramic or teflon in most cases). The high-frequency signals of the antenna must be decoupled and processed. To this end, the HF signals are derived separately through appropriate connections on the microstrip antenna.

Separate detector circuits are provided for the energy signal $P_U$ and the data signal $P_M$.

Regarding the detector circuit for the energy signal $P_U$, the energy signal $P_U$ which is received is applied to the central connection A of a series circuit formed of the two Schottky diodes D1 and D2. This diode circuit is used to rectify and to double the voltage in connection with non-illustrated capacities and is supposed to generate a high output operating voltage $U_B$ at the terminals B and C of the series circuit. A rectifier circuit having only one diode is feasible just as well. As a result, a DC voltage is applied to the terminals B and C which may be used to supply voltage for active components, for example.

The data signal $P_M$ has a polarization offset of 90° and the frequency thereof is close to that of the energy signal $P_U$. The data signal $P_M$ is lower in amplitude than the energy signal $P_U$ by a factor of 100 and is amplitude-modulated. Regarding the detector circuit for the data signal $P_M$, the signal $P_M$ is rectified at the Schottky diode D3 connected to a shunt resistor R which is in turn connected to ground and is available at the terminal D as a modulated DC voltage $U_M$.

The foregoing is a description corresponding in substance to German Application P 36 28 583.8, dated Aug.

22, 1986, the International priority of which is being claimed for the instant application, and which is hereby made part of this application. Any material discrepancies between the foregoing specification and the aforementioned corresponding German application are to be resolved in favor of the latter.

We claim:

1. A receiving device for microwave signals, comprising a single antenna, formed in strip-line technology and having a rectangular shape with adjacent sides perpendicular to each other, for receiving an energy signal and a data signal, said energy signal and said data signal having polarized waveforms whose polarization planes differ by 90°, and two separate detector circuits connected to respectively perpendicularly extending sides of the rectangular antenna for receiving the energy signal and the data signal, respectively, said detector circuits each including a rectifying circuit.

2. A receiving device according to claim 1, wherein said rectifying circuits include diodes.

3. A receiving device according to claim 1, wherein one of said rectifying circuits provides a dc supply voltage.

4. A receiving device according to claim 3, wherein the other rectifying circuit provides a data signal.

5. In a receiving arrangement for microwave signals including antenna means for receiving first and second linearly polarized signals whose polarization planes differ by 90°, and detector means, connected to said antenna means, for detecting said first and second signals; the improvement wherein: said antenna means comprises a single rectangular microstrip-line antenna; and said detector means comprises first and second detector circuits, each including at least one rectifier, connected to respective first and second respectively perpendicularly extending sides of said rectangular antenna for detecting said first and second signals, respectively.

6. A receiving arrangement according to claim 5 wherein said rectifiers are diodes.

7. A receiving arrangement according to claim 6 wherein said diodes are Schottky diodes.

8. A receiving arrangement according to claim 5 wherein: said first signal is an unmodulated energy signal, and said second signal is a modulated data signal; said first detector circuit includes a first diode connected between said first side of said rectangular antenna and a first terminal to provide a dc supply voltage at said first terminal; and said second detector circuit includes a second diode connected between said second side of said rectangular antenna and a second terminal, and a resistor connected between said second terminal and ground, whereby a data signal is provided at said second terminal.

9. A receiving arrangement according to claim 8 wherein said first detector circuit further includes a further diode connected between a third terminal and the point of connection of said first diode to said first side of said antenna, and in series with said first diode, whereby said dc supply voltage is provided between said first and third terminals.

10. A receiving arrangement according to claim 5 wherein the length of said first side is equal to one-half the wavelength of said second signal and the length of said second side is equal to one half the wavelength of said first signal.

* * * * *